(No Model.)
C. F. NEUBERT.
MACHINE HOLDER OR LOCKING DEVICE.
No. 597,526. Patented Jan. 18, 1898.
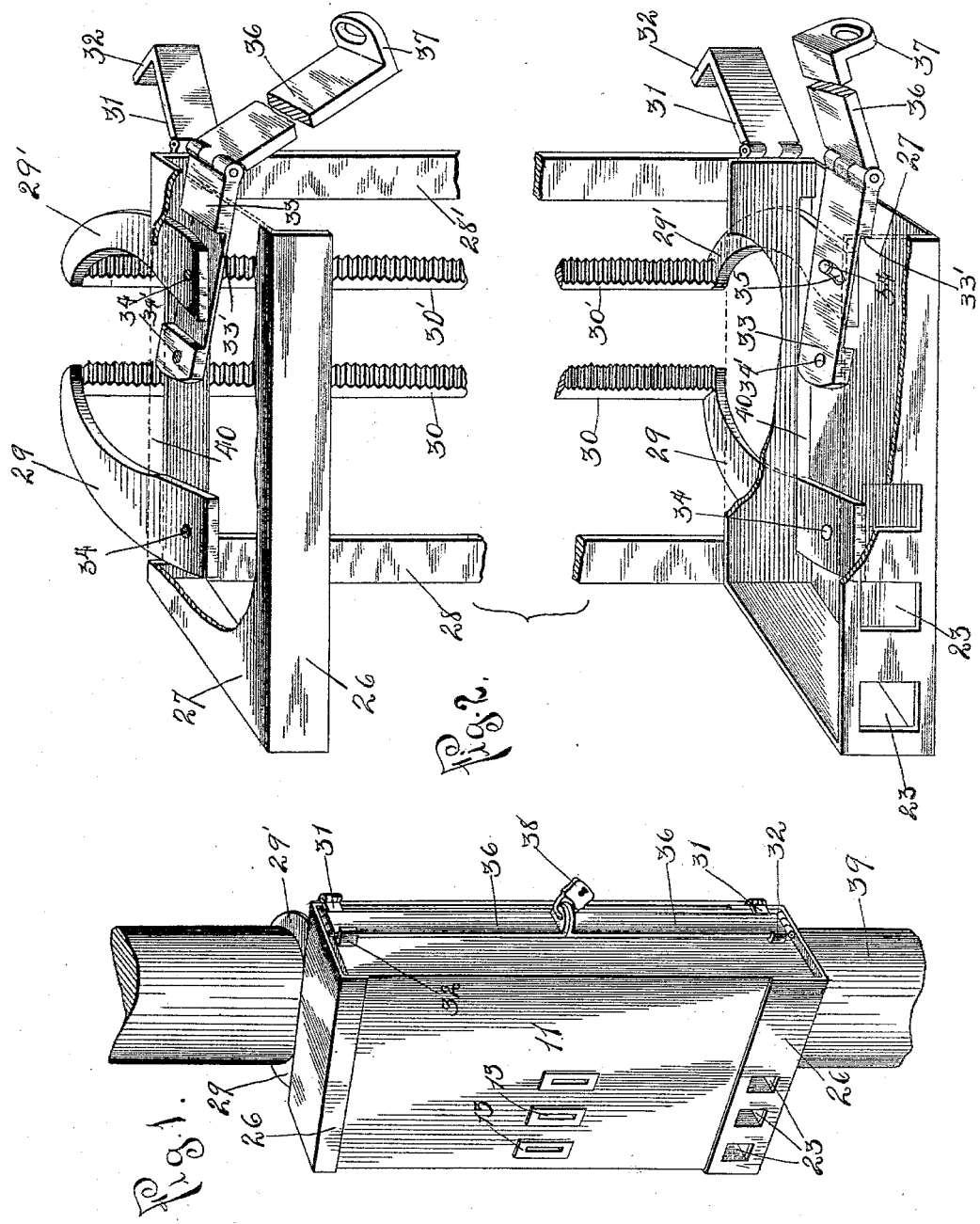

UNITED STATES PATENT OFFICE.

CRISDOF F. NEUBERT, OF CHICAGO, ILLINOIS.

MACHINE HOLDER OR LOCKING DEVICE.

SPECIFICATION forming part of Letters Patent No. 597,526, dated January 18, 1898.

Application filed April 19, 1897. Serial No. 632,863. (No model.)

*To all whom it may concern:*

Be it known that I, CRISDOF F. NEUBERT, a citizen of the United States, residing at Chicago, in the county of Cook and State of Illinois, have invented a new and useful Improvement in Slot-Machines, of which the following is a specification.

My improvement in slot-machines consists of a machine holder or locking device.

The locking device operates in conjunction with a lock, the object being to lock the machine in and securing it to a post, as hereinafter described. I attain this object by the mechanism illustrated in the accompanying drawings, in which—

Figure 1 is a perspective view of the vending-machine and the locking device. Fig. 2 is an enlarged perspective view of the locking device.

Similar figures refer to similar parts throughout both views.

In Fig. 2 the two plates 27 27, with rims 26 26, the two strips 28' 28, the two clamps 29 29, the two clamps 29' 29', the two grips 30 30', the two hinges 31 31, the two locking-blocks 33 33, and the two lap-hinges 36 36 constitute the locking device.

The two plates 27 27 are flat. Each one is provided along its front, one end, and at the rear with a rim 26 26. That part of each rim which is at the rear of each plate is riveted at each of its ends to the strips 28' 28. They have also long narrow openings 40 40, which are next to the flat part of each plate and by means of which a part of each one of the clamps 29 29' 29 29' are passed in on the interior surface of the said plates. Thus each plate 27 has a part of two clamps 29' 29 resting against its interior surface, and the plates are connected to the said clamps by means of rivets, which are indicated at 34 34 34 34. Each one of the clamps extends out from the rear of the plates and terminates with a grip 30 30 30' 30', provided with teeth. On the inner surface of each plate 27 27 is also a locking-block 33 33, the latter being connected to the said plates with rivets. (Indicated at 34' 34'.) Each locking-block is constructed in such a manner that a clamp 29' will rest between the plate 27 and block 33. At one end of each locking-block is also a lap-hinge 36 36, being provided with a lip 37 37. At one end of each rim 26 is also a hinge 31 31, having an engaging lip 32 32, all for the purpose hereinafter described.

The machine is locked in and secured as shown in Fig. 1 and as described below.

The machine is slid into the locking device between the rims 26 26 and held against the post 39, so that the clamps 29 29, with one grip 30, are on one side and the clamps 29' 29', with one grip 30 are on the other side of the said post. Thus the clamps 29 29 are resting firmly against one of the strips 28, with their grip 30 up to the said post, while the clamps 29' 29', with their grip 30', are swinging loosely on the other side of the same. Then the hinges 31 31 are turned so that they lap up against the side of the machine. Next the locking-blocks 33 33 are turned, whereby the edges 33' 33' of the latter (shown in Fig. 2) gradually approach the clamps 29' 29' until the said clamps, with their grip 30', are pushed up against the post. In the meantime the locking-blocks 33 33 are turned up to the strips 28'. The lap-hinges 36 36 are then folded over the hinges 31 31, whereby they lap against the side of the machine 11, so that the two lips 37 37 of the said lap-hinges meet, when a padlock 38 or its kind is passed through the two openings, one in each lip 37. After the lips 37 37 are locked together the engaging lips 32 32 keep the lap-hinges in position, while the said lap-hinges in return keep the locking-blocks 33 33 in position, whereby the edges 33' 33' of the latter press against the clamps 29' 29', so that the grip 30' is kept firmly against the post 39. Thus the machine 11 is locked in the locking device, being at the same time secured firmly to the post 39. The clamps 29 29 and 29' 29' of the locking device may encircle the post entirely or partially and may be arranged as to conform to any size or shaped post, pillar, or column. After the locking device is removed from the post 39 the four clamps of the former 29 29 29' 29' may be folded over each other, so that the two grips 30 30' touch the rear of the machine. Next the locking-blocks 31 31 are turned back to the strip 28, while the lap-hinges 36 36 are again lapped to the side of the machine and locked together by means of the padlock, as before. Thus the locking device, with the machine, may be placed in an upright position on a table, counter, or any other flat surface, and in case that some of the locking devices are to be connected to a wall or other flat upright surface the clamps 29 29 29' 29' may be disconnected from the said locking device for the time being and the locking device connected to the wall or flat surface by means of its strips 28 28'.

The front part of one of the rims 26 of the locking device is provided with openings 23, Fig. 6, which correspond to openings in the machine-case, by means of which the merchandise is removed from the machine.

What I do claim as my invention, and desire to secure by Letters Patent, is—

In a slot-machine the combination of a locking device, having plates 27, 27, and rims 26, 26, having openings 40, 40, hinges 31, 31, having lips 32, 32, the said plates 27, 27, giving connection to clamps, 29, 29', 29, 29', with grips 30, 30', and giving also connection to two locking-blocks 33, 33, provided with lap-hinges 36, 36, the latter having openings at the two lips 37, 37, also two strips 28, 28', giving connection to the rims 26, 26, the two locking-blocks 33, 33, being constructed so that a part of the clamps 29, 29', 29, 29', may rest between them and the plate 27, 27, the said locking-blocks being also provided with edges 33', 33', the latter pressing the clamps 29', 29', with their grip 30', firmly up to the post 39, the said clamps and locking-blocks being all connected to the plates 27, 27, by means of rivets indicated at 34, 34, 34, 34, 34', 34', substantially as set forth.

CRISDOF F. NEUBERT.

Witnesses:
  EMIL A. KOEPPEN,
  THOMAS W. REILLY.